(12) United States Patent
Hommura et al.

(10) Patent No.: US 9,379,403 B2
(45) Date of Patent: Jun. 28, 2016

(54) POLYMER ELECTROLYTE MEMBRANE AND MEMBRANE/ELECTRODE ASSEMBLY FOR POLYMER ELECTROLYTE FUEL CELL

(75) Inventors: Satoru Hommura, Chiyoda-ku (JP); Junichi Tayanagi, Chiyoda-ku (JP); Tetsuji Shimohira, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 857 days.

(21) Appl. No.: 13/564,969

(22) Filed: Aug. 2, 2012

(65) Prior Publication Data
US 2013/0052561 A1  Feb. 28, 2013

Related U.S. Application Data

(60) Provisional application No. 61/568,456, filed on Dec. 8, 2011.

(30) Foreign Application Priority Data

Aug. 26, 2011 (JP) .................. 2011-185103

(51) Int. Cl.
*H01M 8/10* (2006.01)
*H01M 4/90* (2006.01)
*C08J 5/22* (2006.01)
*H01M 4/92* (2006.01)

(52) U.S. Cl.
CPC ............ *H01M 8/1023* (2013.01); *C08J 5/2206* (2013.01); *H01M 8/1051* (2013.01); *C08J 2327/18* (2013.01); *H01M 4/92* (2013.01); *Y02E 60/523* (2013.01)

(58) Field of Classification Search
USPC ........................................ 429/483, 492, 494
See application file for complete search history.

(56) References Cited

U.S. PATENT DOCUMENTS

| 4,465,533 A * | 8/1984 | Covitch .......................... 156/83 |
| 7,931,995 B2 * | 4/2011 | Bahar et al. .................. 429/465 |
| 2006/0019140 A1 | 1/2006 | Kawazoe et al. |

(Continued)

FOREIGN PATENT DOCUMENTS

| CN | 101228655 A | 7/2008 |
| CN | 101745320 A | 6/2010 |

(Continued)

OTHER PUBLICATIONS

International Search Report issued Aug. 28, 2012, in PCT/JP2012/069759 (with English Translation of Category of Cited Documents).

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

A polymer electrolyte membrane includes: (A) an ion exchange resin comprising cation exchange groups which comprise protons; (B) a cerium ion; and (C) at least one second ion selected from the group consisting of a cesium ion and a rubidium ion. A proportion of the cerium ion to the number of the cation exchange groups (100 mol %) is from 0.7 to 30 mol % such that some of the protons in the cation exchange groups are ion-exchanged by the cerium ion. A proportion of the at least one second ion to the number of the cation exchange groups (100 mol %) is from 0.2 to 15 mol % such that some of the protons in the cation exchange groups are ion-exchanged by the at least one second ion.

18 Claims, 1 Drawing Sheet

(56) References Cited

U.S. PATENT DOCUMENTS

| | | | |
|---|---|---|---|
| 2006/0194097 A1* | 8/2006 | Kim et al. | 429/44 |
| 2007/0104994 A1* | 5/2007 | Endoh | C08J 5/2237 |
| | | | 429/483 |
| 2007/0111076 A1 | 5/2007 | Endoh | |
| 2009/0110967 A1 | 4/2009 | Hommura et al. | |
| 2009/0246592 A1 | 10/2009 | Kinoshita | |
| 2011/0027687 A1* | 2/2011 | Hommura et al. | 429/483 |
| 2011/0027688 A1* | 2/2011 | Hommura et al. | 429/483 |

FOREIGN PATENT DOCUMENTS

| | | |
|---|---|---|
| JP | 2003-317736 | 11/2003 |
| JP | 2004-18573 | 1/2004 |
| JP | 2005-538508 | 12/2005 |
| JP | 2006-164966 | 6/2006 |
| JP | 2006-261004 | 9/2006 |
| JP | 2008-98179 | 4/2008 |
| JP | 2008-198447 A | 8/2008 |
| JP | 2010-257772 | 11/2010 |
| JP | 2011-34739 | 2/2011 |
| JP | 2011-140605 | 7/2011 |
| WO | WO 2005/124911 A1 | 12/2005 |
| WO | WO 2007/013533 A1 | 2/2007 |
| WO | WO 2009/116630 A1 | 9/2009 |
| WO | WO 2009/157894 A1 | 12/2009 |

* cited by examiner

POLYMER ELECTROLYTE MEMBRANE AND MEMBRANE/ELECTRODE ASSEMBLY FOR POLYMER ELECTROLYTE FUEL CELL

BACKGROUND OF THE INVENTION

1. Field of the Invention

The present invention relates to a polymer electrolyte membrane and a membrane/electrode assembly for a polymer electrolyte fuel cell.

2. Discussion of Background

A polymer electrolyte fuel cell is, for example, a stack of a plurality of cells each comprising a membrane/electrode assembly sandwiched between two separators. The membrane/electrode assembly comprises an anode and a cathode each having a catalyst layer and a polymer electrolyte membrane disposed between the anode and the cathode, and the catalyst layer and the polymer electrolyte membrane contain an ion exchange resin.

As the reduction reaction of oxygen at the cathode of a polymer electrolyte fuel cell proceeds by means of hydrogen peroxide, hydrogen peroxide or peroxide radicals will form at the cathode. Further, to the anode, oxygen molecules pass through the polymer electrolyte membrane from the cathode, and accordingly hydrogen peroxide or peroxide radicals may form in some cases also at the anode. Hydrogen peroxide or peroxide radicals formed at the cathode or the anode are known to deteriorate the ion exchange resin contained in the polymer electrolyte membrane and the catalyst layer.

As a polymer electrolyte membrane for a polymer electrolyte fuel cell and a membrane/electrode assembly, having durability to hydrogen peroxide or peroxide radicals, the following have been proposed.

(1) A membrane/electrode assembly containing ions of a metal selected from cerium, titanium, manganese, silver and ytterbium (Patent Document 1).

(2) A membrane/electrode assembly having a peroxide decomposition catalyst containing element selected from platinum, palladium, iridium, carbon, silver, gold, rhodium, ruthenium, tin, silicon, titanium, zirconium, aluminum, hafnium, tantalum, niobium and cerium (Patent Document 2).

(3) A polymer electrolyte membrane having a part of protons in cation exchange groups of the ion exchange resin ion-exchanged by ions of an alkali metal selected from lithium, sodium, potassium, rubidium and cesium (Patent Document 3).

(4) A polymer electrolyte membrane having a part of protons in cation exchange groups of the ion exchange resin ion-exchanged by ions of a polyvalent metal selected from magnesium, calcium, strontium, barium, zinc, copper, aluminum, gallium, indium, yttrium, lanthanum, titanium, zirconium and hafnium (Patent Document 4).

(5) A polymer electrolyte membrane containing cerium ions (Patent Document 5).

(6) A polymer electrolyte membrane containing cerium ions or manganese ions (Patent Document 6).

However, durability to hydrogen peroxide or peroxide radicals of the polymer electrolyte membranes for a polymer electrolyte fuel cell and the membrane/electrode assemblies (1) to (6) is still insufficient. Therefore, further improvement in the durability is required for a polymer electrolyte membrane for a polymer electrolyte fuel cell and a membrane/electrode assembly.

Patent Document 1: JP-A-2006-164966
Patent Document 2: JP-A-2005-538508
Patent Document 3: WO2009/157894
Patent Document 4: JP-A-2004-018573
Patent Document 5: WO2005/124911
Patent Document 6: WO2007/013533

SUMMARY OF THE INVENTION

The object of the present invention is to provide a polymer electrolyte membrane and a membrane/electrode assembly for a polymer electrolyte fuel cell, excellent in the durability to hydrogen peroxide or peroxide radicals.

The polymer electrolyte membrane of the present invention is a polymer electrolyte membrane comprising an ion exchange resin having cation exchange groups, which contains cerium element and at least one member selected from cesium element and rubidium element.

It is preferred that the at least one member selected from cesium element and rubidium element is contained in the form of ions.

It is preferred that the proportion of the total amount of the at least one member selected from cesium element and rubidium element to the number (100 mol %) of the cation exchange groups contained in the polymer electrolyte membrane is from 0.1 to 40 mol %.

It is preferred that the cerium element is contained in the form of cerium ions.

The cerium element may be contained also in the form of at least one member selected from the group consisting of cerium phosphate, cerium oxide, cerium fluoride, cerium tungstate and a cerium salt of a heteropolyacid.

It is preferred that the proportion of the cerium element to the number (100 mol %) of the cation exchange groups contained in the polymer electrolyte membrane is from 0.3 to 50 mol %.

It is preferred that the ion exchange resin is a fluorinated ion exchange resin.

It is preferred that the fluorinated ion exchange resin has groups represented by the following formula (β) or has groups represented by the following formula (γ):

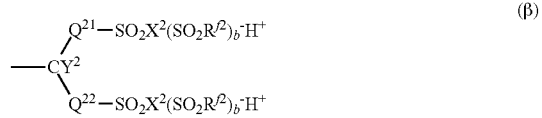

wherein $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoroorganic group, $R^{f2}$ is a perfluoroalkyl group which may have an etheric oxygen atom, $X^2$ is an oxygen atom, a nitrogen atom or a carbon atom, and b is 0 when $X^2$ is an oxygen atom, 1 when $X^2$ is a nitrogen atom, and 2 when $X^2$ is a carbon atom;

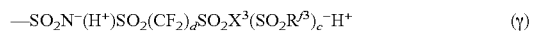

wherein $R^{f3}$ is a $C_{1-10}$ perfluoroalkyl group which may have an etheric oxygen atom, $X^3$ is an oxygen atom or a nitrogen atom, c is 0 when $X^3$ is an oxygen atom, and 1 when $X^3$ is a nitrogen atom, and d is an integer of from 1 to 4.

The polymer electrolyte membrane of the present invention may further has a reinforcing member.

It is preferred that the reinforcing member is a porous product made of polytetrafluoroethylene.

The membrane/electrode assembly for a polymer electrolyte fuel cell of the present invention comprises an anode having a catalyst layer containing a catalyst and an ion exchange resin, a cathode having a catalyst layer containing a catalyst and an ion exchange resin, and a polymer electrolyte membrane disposed between the anode and the cathode, wherein the polymer electrolyte membrane is the polymer electrolyte membrane of the present invention.

The membrane/electrode assembly for a polymer electrolyte fuel cell of the present invention comprises an anode having a catalyst layer containing a catalyst and an ion exchange resin, a cathode having a catalyst layer containing a catalyst and an ion exchange resin, and a polymer electrolyte membrane disposed between the anode and the cathode, wherein the catalyst layer of at least one of the anode and the cathode contains cerium element and at least one member selected from cesium element and rubidium element.

The polymer electrolyte membrane and the membrane/electrode assembly for a polymer electrolyte fuel cell of the present invention are excellent in the durability to hydrogen peroxide or peroxide radicals, and stand a long term use.

DETAILED DESCRIPTION OF THE PREFERRED EMBODIMENTS

Figure 1:
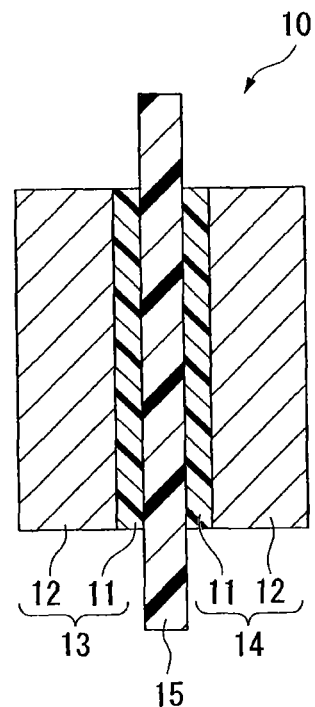
FIG. 1 is a cross-sectional view illustrating one example of a membrane/electrode assembly.

In this specification, repeating units represented by the formula (U1) will be referred to as units (U1). The same applies to repeating units represented by other formulae. Repeating units mean units derived from a monomer formed by polymerization of the monomer. The repeating units may be units directly formed by the polymerization reaction, or may be units having part of the units converted to another structure by treating the polymer.

Further, in this specification, a compound represented by the formula (M1) will be referred to as a compound (M1). The same applies to compounds represented by other formulae.

Further, in this specification, a group represented by the formula ($\alpha$) will be referred to as a group ($\alpha$). The same applies to groups represented by other formulae.

<Polymer Electrolyte Membrane>

The polymer electrolyte membrane of the present invention comprises an ion exchange resin having cation exchange groups and as the case requires, a reinforcing member, wherein the ion exchange resin and/or the reinforcing member contain cerium elements and at least one member selected from cesium element and rubidium element (hereinafter "at least one member selected from cesium element and rubidium element" will sometimes be referred to as "element (X)"). The cerium element and the element (X) may be contained in either one of the ion exchange resin and the reinforcing member or may be contained in both of them, and they are preferably contained in the ion exchange resin with a view to efficiently suppressing deterioration of the ion exchange resin by hydrogen peroxide or peroxide radicals.

(Cerium Element)

The cerium element is contained in the polymer electrolyte membrane in the form of e.g. ions, a compound, a metal elemental substance or an alloy. However, use of the metal elemental substance or the alloy is limited, since short circuiting may occur at the polymer electrolyte membrane.

The cerium element is preferably contained in the form of ions with a view to obtaining a polymer electrolyte membrane excellent in the durability to hydrogen peroxide or peroxide radicals. When the cerium element is contained in the form of ions, a part of protons in cation exchange groups of the ion exchange resin are ion-exchanged by cerium ions, whereby deterioration of the ion exchange resin by hydrogen peroxide or peroxide radicals can sufficiently be suppressed.

As a method of incorporating cerium ions in the polymer electrolyte membrane, for example, the following methods may be mentioned. Particularly, method (1) is preferred, whereby a homogeneous membrane will be obtained and the productivity tends to be good.

(1) A method of adding a cerium salt to a dispersion (D) of the ion exchange resin to prepare a liquid composition (L) containing the ion exchange resin and cerium ions, and forming the liquid composition (L) into a film e.g. by a casting method to obtain a polymer electrolyte membrane.

(2) A method of immersing a polymer electrolyte membrane containing an ion exchange resin in a solution containing cerium ions.

(3) A method of bringing an organic metal complex salt of cerium and a polymer electrolyte membrane containing an ion exchange resin into contact with each other.

The cerium ions may be +3-valent or may be +4-valent.

The cerium salt to obtain the liquid composition (L) or the solution containing cerium ions may, for example, be cerium carbonate, cerium acetate, cerium chloride, cerium nitrate, cerium sulfate, diammonium cerium(III) nitrate or tetraammonium cerium(IV) sulfate, and is preferably cerium carbonate, with a view to easily removing carbonic acid as a gas from the liquid.

The organic metal complex salt of cerium may, for example, be cerium acetylacetonate.

Here, even when the cerium element is contained in the polymer electrolyte membrane in the form of a hardly soluble cerium compound, deterioration of the ion exchange resin by hydrogen peroxide or peroxide radicals can be suppressed. That is, a hardly soluble cerium compound generates cerium ions by being partially dissociated or dissolved in the polymer electrolyte membrane. Further, the hardly soluble cerium compound itself functions as a decomposition catalyst of hydrogen peroxide or peroxide radicals.

As a method of incorporating the hardly soluble cerium compound in the polymer electrolyte membrane, for example, the same method as the above method (1) may be mentioned.

The hardly soluble compound may, for example, be cerium phosphate, cerium oxide ($CeO_2$, $Ce_2O_3$), cerium hydroxide, cerium fluoride, cerium oxalate, cerium tungstate or a cerium salt of a heteropolyacid. It is preferably at least one member selected from the group consisting of cerium phosphate, cerium oxide, cerium fluoride, cerium tungstate and a cerium salt of a heteropolyacid, in view of a high effect of suppressing deterioration of the ion exchange resin by hydrogen peroxide or peroxide radicals. Particularly, cerium oxide is preferred in view of excellent dispersibility when added to the liquid composition (L).

The proportion of the cerium element to the number (100 mol %) of the cation exchange groups contained in the polymer electrolyte membrane is preferably from 0.3 to 50 mol %, more preferably from 0.7 to 30 mol %, further preferably from 1 to 20 mol %, particularly preferably from 1.5 to 15 mol %. When the proportion of the cerium element is at least 0.3 mol %, deterioration of the ion exchange resin by hydrogen peroxide or peroxide radicals will more efficiently be suppressed. When the proportion of the cerium element is at most 50 mol %, the proportion of protons of the ion exchange resin to be ion-exchanged will be reduced, whereby the proton conductivity of the polymer electrolyte membrane can be sufficiently secured.

(Element (X))

At least one element (X) selected from cesium element and rubidium element is contained in the polymer electrolyte membrane in the form of e.g. ions, a compound, a metal elemental substance or an alloy. However, use of the metal element substance or the alloy is limited, since its handling is difficult.

The element (X) is contained preferably in the form of ions, with a view to obtaining a polymer electrolyte membrane excellent in the durability to hydrogen peroxide or peroxide radicals. When the element (X) is contained in the form of ions, a part of protons in the cation exchange groups of the ion exchange resin will be ion-exchanged by ions of the element (X), and deterioration of the ion exchange resin by hydrogen peroxide or peroxide radicals will efficiently be suppressed.

The method of incorporating the ions of the element (X) in the polymer electrolyte membrane may, for example, be the same method as the above-described method of incorporating cerium ions in the polymer electrolyte membrane, and is preferably the same method as method (1), whereby a homogeneous membrane will be obtained, and the productivity tends to be good.

Further, when the element (X) is incorporated in the polymer electrolyte membrane, it is preferred to incorporate the element (X) prior to the cerium element, in view of a high durability of the polymer electrolyte membrane. For example, in the case of the above-described method (1), a salt of the element (X) is added to the dispersion (D) of the ion exchange resin, and then a cerium salt is added to prepare a liquid composition (L) containing the ion exchange resin, and the element (X) ions and the cerium ions. In the case of method (2), the polymer electrolyte membrane containing an ion exchange resin is immersed in a solution containing element (X) ions, and then the polymer electrolyte membrane is immersed in the solution containing cerium ions. In the case of method (3), the organic metal complex salt of the element (X) and the polymer electrolyte membrane containing the ion exchange resin are brought into contact with each other, and then the organic metal complex salt of cerium and the polymer electrolyte membrane are brought into contact with each other.

The cesium salt to obtain the liquid composition (L) or the solution containing cesium ions may be a water soluble cesium salt. The water soluble cesium salt may, for example, be cesium carbonate, cesium sulfate, cesium nitrate, cesium chloride, cesium acetate, cesium fluoride, cesium hydrogencarbonate, cesium molybdate, cesium iodide, cesium bromide or cesium oxide, and is preferably cesium carbonate with a view to easily removing carbonic acid as a gas from the liquid.

The rubidium salt to obtain the liquid composition (L) or the solution containing rubidium ions may be a water soluble rubidium salt. The water soluble rubidium salt may, for example, be rubidium carbonate, rubidium sulfate, rubidium nitrate, rubidium chloride, rubidium acetate, rubidium fluoride, rubidium molybdate, rubidium iodide or rubidium hydroxide, and is preferably rubidium carbonate with a view to easily removing carbonic acid as a gas from the liquid.

Here, even when the element (X) is contained in the polymer electrolyte membrane in the form of the hardly soluble element (X) compound, deterioration of the ion exchange resin by hydrogen peroxide or peroxide radicals can be suppressed. That is, the hardly soluble element (X) generates ions of the element (X) by being partially dissociated or dissolved in the polymer electrolyte membrane.

The method of incorporating the hardly soluble element (X) compound in the polymer electrolyte membrane may, for example, be the same method as the above method (1).

The hardly soluble cesium compound may, for example, be cesium tungstate or cesium dihydrogen phosphate.

The hardly soluble rubidium compound may, for example, be rubidium tungstate, rubidium phosphate or rubidium dihydrogen phosphate.

The proportion of the total amount of the element (X) to the number (100 mol %) of the cation exchange groups contained in the polymer electrolyte membrane is preferably from 0.1 to 40 mol %, more preferably from 0.1 to 30 mol %, further preferably from 0.2 to 25 mol %, particularly preferably from 0.2 to 15 mol %. When the proportion of the total amount of the element (X) is at least 0.1 mol %, deterioration of the ion exchange resin by hydrogen peroxide or peroxide radicals will more efficiently be suppressed. When the proportion of the total amount of the element (X) is at most 40 mol %, the proportion of protons of the ion exchange resin to be ion-exchanged tends to be reduced, whereby the proton conductivity of the polymer electrolyte membrane can sufficiently be secured.

(Ion Exchange Resin)

The ion exchange resin is a polymer having cation exchange groups.

The cation exchange groups are groups in which a part of cations can be ion-exchanged by other cations. Such ion exchange groups may be an acid form wherein the cation is proton, and a salt form wherein the cation is a metal ion, an ammonium ion or the like. In the case of the polymer electrolyte membrane for a polymer electrolyte fuel cell, usually an ion exchange resin having acid-form cation exchange groups is used. In the ion exchange resin having acid-form cation exchange groups, a part of protons in the cation exchange groups may be ion-exchanged by the cerium ions or the ions of the element (X).

The acid-form cation exchange groups may, for example, be sulfonic acid groups (—SO$_3$H), sulfonimide groups (—SO$_2$N(H)—), sulfonmethide groups (—SO$_2$C(H)<), phosphonic acid groups (—P(O)(OH)$_2$), carboxylic acid groups (—C(O)OH) or ketoimide groups (>C=NH). They are preferably sulfonic acid groups, sulfonimide groups or sulfonmethide groups in view of high acidity and high chemical stability, more preferably sulfonic acid groups or sulfonimide groups, particularly preferably sulfonic acid groups.

The ion exchange resin may, for example, be an ion exchange resin containing no fluorine atom (e.g. a hydrocarbon type polymer having cation exchange groups) or a fluorinated ion exchange resin (e.g. a perfluorocarbon polymer having cation exchange groups), and is preferably a fluorinated ion exchange resin, more preferably a perfluorocarbon polymer having cation exchange groups (which may contain an etheric oxygen atom) in view of durability.

The perfluorocarbon polymer may be a polymer (H1) having groups (α) as described hereinafter, a polymer (H2) having groups (β) as described hereinafter or a polymer (H3) having groups (γ) as described hereinafter.

(Polymer (H1))

The polymer (H1) is a polymer having groups (α) (excluding the polymer (H2) and the polymer (H3)). The polymer (H1) may be a polymer having units (U1):

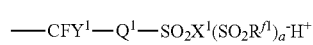
(a)

-continued

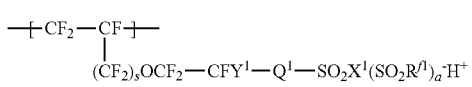  (U1)

wherein $Q^1$ is a single bond or a perfluoroalkylene group which may have an etheric oxygen atom, $Y^1$ is a fluorine atom or a monovalent perfluoroorganic group, s is 0 or 1, $R^{f1}$ is a perfluoroalkyl group which may have an etheric oxygen atom, $X^1$ is an oxygen atom, a nitrogen atom or a carbon atom, and a is 0 when $X^1$ is an oxygen atom, 1 when $X^1$ is a nitrogen atom, and 2 when $X^1$ is a carbon atom. The single bond means that the carbon atom of $CFY^1$ and the sulfur atom of $SO_2$ are directly bonded. The organic group means a group containing at least one carbon atom.

Unit (U1):

In a case where the perfluoroalkylene group as $Q^1$ in the unit (U1) has an etheric oxygen atom, the number of such an oxygen atom may be 1 or more. Further, such an oxygen atom may be inserted in the carbon atom/carbon atom bond of the perfluoroalkylene group or may be inserted at the terminal of the carbon atom bond.

The perfluoroalkylene group may be linear or branched.

The number of carbon atoms in the perfluoroalkylene group is preferably from 1 to 6, more preferably from 1 to 4. When the number of carbon atoms is at most 6, a decrease in the ion exchange capacity of the polymer (H1) will be suppressed, and a decrease in the proton conductivity will be suppressed.

The perfluoroalkyl group as $R^{f1}$ may be linear or branched, and is preferably linear.

The number of carbon atoms in the perfluoroalkyl group is preferably from 1 to 6, more preferably from 1 to 4. The perfluoroalkyl group is preferably e.g. a perfluoromethyl group or a perfluoroethyl group.

—$SO_2X^1(SO_2R^{f1})_a^-H^+$ may be a sulfonic acid group (—$SO_3^-H^+$), a sulfonimide group (—$SO_2N(SO_2R^{f1})^-H^+$) or a sulfonmethide group (—$SO_2C(SO_2R^{f1})_2^-H^+$).

$Y^1$ is preferably a fluorine atom or a trifluoromethyl group.

As the unit (U1), unit (u1) is preferred, and unit (u1-1), unit (u1-2), unit (u1-3) or unit (u1-4) is more preferred, whereby production of the polymer (H1) will be easy, and industrial application is easy.

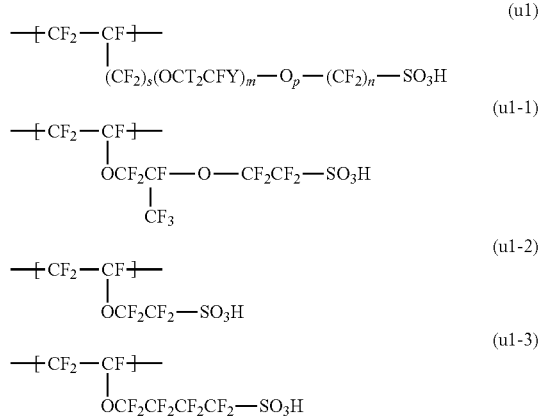

-continued

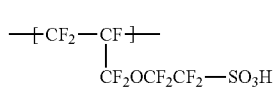  (u1-4)

In the above formulae, Y is a fluorine atom or a trifluoromethyl group, m is an integer of from 0 to 3, n is an integer of from 1 to 12, p is 0 or 1, m+p>0, and s is as defined above.

Other Units:

The polymer (H1) may further have repeating units based on another monomer described hereinafter (hereinafter sometimes referred to as other units). The proportion of such other units is properly adjusted so that the ion exchange capacity of the polymer (H1) is within a preferred range described hereinafter.

Such other units are preferably repeating units based on a perfluoromonomer, more preferably repeating units based on tetrafluoroethylene (hereinafter referred to as TFE), in view of the mechanical strength and the chemical durability.

The polymer (H1) may have one type of the units (U1) and other units, or may have two or more types of each of the units.

The polymer (H1) is preferably a perfluoropolymer in view of the chemical durability.

The ion exchange capacity of the polymer (H1) is preferably from 0.5 to 1.8 meq/g dry resin, more preferably from 0.9 to 1.5 meq/g dry resin. When the ion exchange capacity is at least 0.5 meq/g dry resin, the proton conductivity tends to be high, whereby sufficient cell output will be obtained. When the ion exchange capacity is at most 1.8 meq/g dry resin, preparation of a polymer having a high molecular weight will be easy, and as the polymer (H1) is not excessively swollen by water, the mechanical strength can be maintained.

Process for Producing Polymer (H1):

The polymer (H1) can be produced, for example, by the following steps.

(i) A step of polymerizing a compound (M1) and another monomer as the case requires to obtain a precursor polymer having —$SO_2F$ (hereinafter referred to as polymer (F1)):

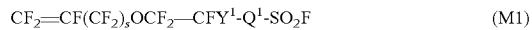  (M1)

wherein $Q^1$, $Y^1$ and s are as defined above.

(ii) A step of bringing the polymer (F1) and a fluorine gas into contact with each other as the case requires to fluorinate unstable terminal groups of the polymer (F1).

(iii) A step of converting —$SO_2F$ in the polymer (F1) to a sulfonic acid group, a sulfonimide group or a sulfonmethide group to obtain the polymer (H1).

Step (i):

The compound (M1) is preferably a compound (m1), more preferably a compound (m1-1), (m1-2), (m1-3) or (m1-4).

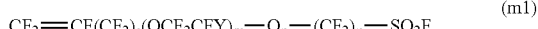  (m1)

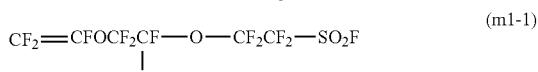  (m1-1)

  (m1-2)

  (m1-3)

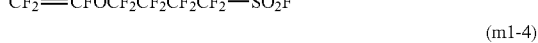  (m1-4)

In the above formulae, s, m, p and n are as defined above.

The compound (M1) may be produced by a known preparation method such as a method disclosed in "Du Pont Innovation", D. J. Vaugham, vol. 43, No. 3, 1973, p. 10, or a method disclosed in Examples of U.S. Pat. No. 4,358,412.

The another monomer may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether) or a perfluoro(etheric oxygen atom-containing alkyl vinyl ether)).

The polymerization method may be a known polymerization method such as a bulk polymerization method, a solution polymerization method, a suspension polymerization method or an emulsion polymerization method. Further, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical initiator.

Step (ii):

The unstable terminal groups are groups formed by a chain transfer reaction, groups based on the radical initiator, etc. and are specifically —COOH, —CF=CF$_2$, —COF, —CF$_2$H or the like. By fluorinating or stabilizing the unstable terminal groups, decomposition of the polymer (H1) will be suppressed, thus improving the durability.

The fluorine gas may be diluted with an inert gas such as nitrogen, helium or carbon dioxide or may be used as it is without being diluted.

The temperature when the polymer (H1) and the fluorine gas are brought into contact with each other is preferably from room temperature to 300° C., more preferably from 50 to 250° C., further preferably from 100 to 220° C., particularly preferably from 150 to 200° C.

The time of contact of the polymer (H1) and the fluorine gas is preferably from one minute to one week, more preferably from 1 to 50 hours.

Step (iii):

For example, when —SO$_2$F is converted to a sulfonic acid group, a step (iii-1) is carried out, and when —SO$_2$F is converted to a sulfonimide group, a step (iii-2) is carried out.

(iii-1) A step of hydrolyzing —SO$_2$F of the polymer (F1) to convert it to a sulfonate, and converting the sulfonate to an acid form to convert it to a sulfonic acid group.

(iii-2) A step of imidizing —SO$_2$F of the polymer (F1) to convert it to a salt form sulfonimide group (—SO$_2$NMSO$_2$R$^{f1}$) (wherein M is an alkali metal or primary to quaternary ammonium), and converting the salt form sulfonimide group to an acid form to convert it to an acid form sulfonimide group (—SO$_2$NHSO$_2$R$^{f1}$).

Step (iii-1):

The hydrolysis is carried out, for example, by bringing the polymer (F1) and a basic compound into contact with each other in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethylsulfoxide.

The conversion to an acid form is carried out, for example, by bringing the polymer having a sulfonate into contact with an aqueous solution of hydrochloric acid, sulfuric acid or the like.

The hydrolysis and the conversion to an acid form are carried out usually at from 0 to 120° C.

Step (iii-2):

As the imidization, the following methods may be mentioned.

(iii-2-1) A method of reacting —SO$_2$F and R$^{f1}$SO$_2$NHM.

(iii-2-2) A method of reacting —SO$_2$F and R$^{f1}$SO$_2$NH$_2$ in the presence of an alkali metal hydroxide, an alkali metal carbonate, MF, ammonia or a primary to tertiary amine.

(iii-2-3) A method of reacting —SO$_2$F and R$^{f1}$SO$_2$NMSi(CH$_3$)$_3$.

The conversion to an acid form is carried out by treating the polymer having salt-form sulfonimide groups with an acid (such as sulfuric acid, nitric acid or hydrochloric acid).

(Polymer (H2))

The polymer (H2) is a polymer having groups (β) (excluding the polymer (H3)). The polymer (H2) may be a polymer having units (U2).

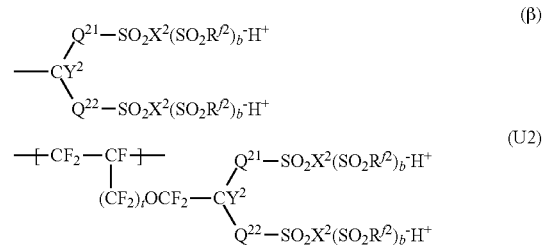

In the above formulae, Q$^{21}$ is a perfluoroalkylene group which may have an etheric oxygen atom, Q$^{22}$ is a single bond or a perfluoroalkylene group which may have an etheric oxygen atom, Y$^2$ is a fluorine atom or a monovalent perfluoroorganic group, t is 0 or 1, R$^{f2}$ is a perfluoroalkyl group which may have an etheric oxygen atom, X$^2$ is an oxygen atom, a nitrogen or a carbon atom, b is 0 when X$^2$ is an oxygen atom, 1 when X$^2$ is a nitrogen atom, and 2 when X$^2$ is a carbon atom. The single bond means that the carbon atom of CY$^1$ or CY$^2$ and the sulfur atom of SO$_2$ are directly bonded. The organic group is a group having at least one carbon atom.

Unit (U2):

In a case where the perfluoroalkylene group in Q$^{21}$ or Q$^{22}$ in the unit (U2) has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the material fluoromonomer tends to be low, whereby distillation and purification tend to be easy. Further, when the number of carbon atoms is at most 6, an increase in the ion exchange capacity of the polymer (H2) will be suppressed, and a decrease in the proton conductivity will be suppressed.

Q$^{22}$ is preferably a C$_{1-6}$ perfluoroalkylene group which may have an etheric oxygen atom. When Q$^{22}$ is a C$_{1-6}$ perfluoroalkylene group which may have an etheric oxygen atom, excellent stability of the power generation performance will be obtained when a polymer electrolyte fuel cell is operated for a long period of time, as compared with a case where Q$^{22}$ is a single bond.

At least one of $Q^{21}$ and $Q^{22}$ is preferably a $C_{1-6}$ perfluoroalkylene group having an etheric oxygen atom. A fluoromonomer having a $C_{1-6}$ perfluoroalkylene group having an etheric oxygen atom can be prepared without a fluorination reaction by a fluorine gas, and accordingly it can be produced easily with a good yield.

The perfluoroalkyl group as $R^{f2}$ may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where the unit (U2) has two or more $R^{f2}$, the $R^{f2}$ may be the same group or may be different groups.

$—(SO_2X^2(SO_2R^{f2})_b)^-H^+$ may be a sulfonic acid group $(—SO_3^-H^+)$, a sulfonimide group $(—SO_2N(SO_2R^{f2})^-H^+)$ or a sulfonmethide group $(—SO_2C(SO_2R^{f2})_2)^-H^+)$.

$Y^2$ is preferably a fluorine atom or a $C_{1-6}$ linear perfluoroalkyl group which may have an etheric oxygen atom.

The unit (U2) is preferably unit (u2), and in view of easy production of the polymer (H2) and easy industrial application, it is more preferably unit (u2-1), unit (u2-2) or unit (u2-3).

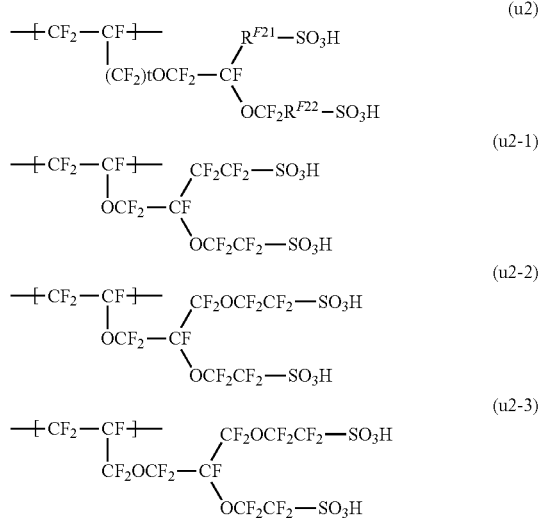

In the above formulae, $R^{F21}$ is a single bond or a $C_{1-6}$ linear perfluoroalkylene group which may have an etheric oxygen atom, $R^{F22}$ is a $C_{1-6}$ linear perfluoroalkylene group, and t is as defined above.

Other Units:

The polymer (H2) may further have repeating units based on the above another monomer. Further, it may have the above units (U1). The proportion of such other units is properly adjusted so that the ion exchange capacity of the polymer (H2) is within the preferred range described hereinafter.

Other units are preferably repeating units based on the perfluoromonomer in view of the mechanical strength and the chemical durability, more preferably repeating units based on TFE.

The polymer (H2) may have one type of each of the units (U2) and other units or may have two or more types of each of the units.

The polymer (H2) is preferably a perfluoropolymer in view of the chemical durability.

The ion exchange capacity of the polymer (H2) is preferably from 0.5 to 2.8 meq/g dry resin, more preferably from 0.9 to 2.2 meq/g dry resin. When the ion exchange capacity is at least 0.5 meq/g dry resin, the proton conductivity tends to be high, whereby sufficient cell output can be obtained. When the ion exchange capacity is at most 2.8 meq/g dry resin, preparation of a polymer having a high molecular weight will be easy, and the polymer (H2) will not excessively be swollen by water, whereby the mechanical strength can be maintained.

Process for Producing Polymer (H2):

The polymer (H2) can be produced, for example, by the following steps.

(i) A step of polymerizing the compound (M2) and another monomer as the case requires to obtain a precursor polymer having $—SO_2F$ (hereinafter referred to as polymer (F2)).

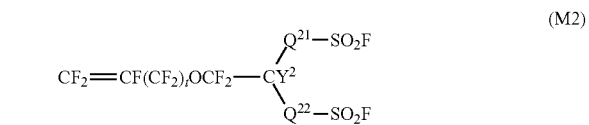

wherein $Q^{21}$, $Q^{22}$, $Y^2$ and t are as defined above.

(ii) A step of bringing the polymer (F2) and a fluorine gas into contact with each other as the case requires to fluorinate unstable terminal groups of the polymer (F2).

(iii) A step of converting $—SO_2F$ of the polymer (F2) to a sulfonic acid group, a sulfonimide group or a sulfonmethide group to obtain the polymer (H2).

Step (i):

The compound (M2) is preferably a compound (m2), more preferably a compound (m2-1), (m2-2) or (m2-3).

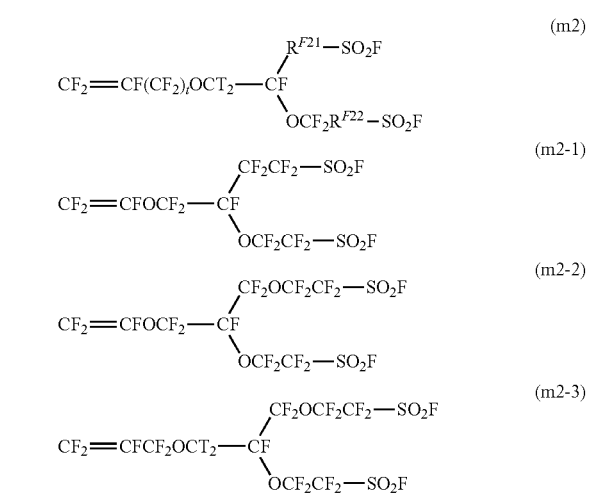

wherein $R^{F21}$, $R^{F22}$ and t are as defined above.

The compound (M2) may be produced by a known preparation method such as a method disclosed in Patent Document 6.

The above another monomer may, for example, be the monomer exemplified in the process for producing polymer (H1).

The polymerization method may be the same polymerization method as in the process for producing polymer (H1).

Step (ii):

The fluorination of unstable terminal groups may be carried out in the same manner as in the step (ii) in the process for producing polymer (H1).

Step (iii):

The conversion of —SO$_2$F in the polymer (F2) to a sulfonic acid group, a sulfonimide group or a sulfonmethide group may be carried out in the same manner as in the step (iii) in the process for producing polymer (H1).

(Polymer (H3))

The polymer (H3) is a polymer having groups (γ). The polymer (H3) may be a polymer having units (U3).

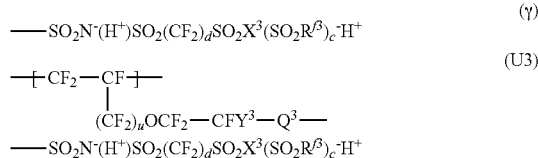

In the above formulae, $Q^3$ is a single bond or a perfluoroalkylene group which may have an etheric oxygen atom, $Y^3$ is a fluorine atom or a monovalent perfluoroorganic group, u is 0 or 1, $R^{f3}$ is a $C_{1-10}$ perfluoroalkyl group which may have an etheric oxygen atom, $X^3$ is an oxygen atom or a nitrogen atom, c is 0 when $X^3$ is an oxygen atom, and 1 when $X^3$ is a nitrogen atom, and d is an integer of from 1 to 4.

The single bond means that the carbon atom of $CFY^3$ and the sulfur atom of $SO_2$ are directly bonded. The organic group means a group containing at least one carbon atom.

Unit (U3):

In a case where the perfluoroalkylene group as $Q^3$ in the unit (U3) has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched.

The number of carbon atoms in the perfluoroalkylene group is preferably from 1 to 10, more preferably from 1 to 6, further preferably from 1 to 4. When the number of carbon atoms is at most 10, a decrease in the ion exchange capacity of the polymer (H3) will be suppressed, and a decrease in the proton conductivity will be suppressed.

The perfluoroalkyl group as $R^{f3}$ may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

—(SO$_2$X$^3$(SO$_2$R$^{f3}$)$_c$)$^-$H$^+$ may be a sulfonic acid group (—SO$_3$$^-$H$^+$), a sulfonimide group (—SO$_2$N(SO$_2$R$^{f3}$)$^-$H$^+$) or a sulfonmethide group (—SO$_2$C(SO$_2$R$^{f3}$)$_2$$^-$H$^+$).

$Y^3$ is preferably a fluorine atom or a trifluoromethyl group.

d is particularly preferably 2, whereby the monomer (M3) will easily be prepared and a polymer (H3) having a high ion exchange capacity will be obtained.

The unit (U3) is preferably unit (u3), and in view of easy production of the polymer (H3) and easy industrial application, more preferably unit (u3-1), (u3-2), (u3-3) or (u3-4).

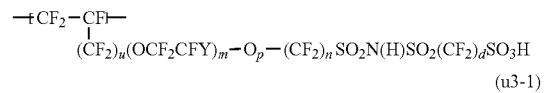

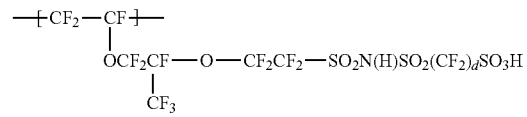

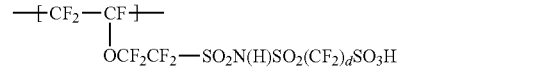

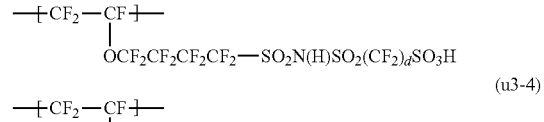

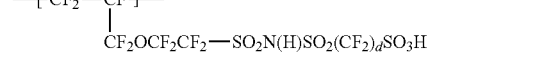

In the above formulae, m is an integer of from 0 to 3, p is 0 or 1, and m+p>0, n is an integer of from 1 to 12, and u and d are as defined above.

Other Units:

The polymer (H3) may further have repeating units based on the above another monomer. Further, it may have the above units (U1) and/or units (U2). The proportion of other units is properly adjusted so that the ion exchange capacity of the polymer (H3) is within a preferred range described hereinafter.

Such other units are preferably repeating units based on a perfluoromonomer, more preferably repeating units based on TFE, in view of the mechanical strength and the chemical durability.

The polymer (H3) may have one type of each of the units (U3) and other units, or may have two or more types of each of the units.

The polymer (H3) is preferably a perfluoropolymer in view of the chemical durability.

The ion exchange capacity of the polymer (H3) is preferably from 0.5 to 2.8 meq/g dry resin, more preferably from 0.9 to 2.2 meq/g dry resin. When the ion exchange capacity is at least 0.5 meq/g dry resin, the proton conductivity tends to be high, whereby sufficient cell output will be obtained. When the ion exchange capacity is at most 2.8 meq/g dry resin, preparation of a polymer having a high molecular weight will be easy, and the polymer (H3) will not excessively be swollen by water, whereby the mechanical strength can be maintained.

Process for Producing Polymer (H3):

The polymer (H3) may be produced, for example, by the following steps.

(i) A step of converting —SO$_2$F in a polymer having —SO$_2$F to —SO$_2$NH$_2$.

(ii) A step of reacting the polymer obtained in the step (i) with FSO$_2$(CF$_2$)$_d$SO$_2$F to convert —SO$_2$NH$_2$ to —SO$_2$N$^-$(H$^+$)SO$_2$(CF$_2$)$_d$SO$_2$F.

(iii) A step of converting —SO$_2$N$^-$(H$^+$)SO$_2$(CF$_2$)$_d$SO$_2$F in the polymer obtained in the step (ii) to —SO$_2$N$^-$(H$^+$)SO$_2$(CF$_2$)$_2$SO$_2$X$^3$(SO$_2$R$^{f3}$)$_c$$^-$H$^+$.

Step (i):

The polymer having —SO$_2$F may, for example, be the above-described polymer (F1).

As a method of converting —SO$_2$F to —SO$_2$NH$_2$, a method of bringing the polymer (F1) into contact with ammonia may be mentioned.

As the method of bringing the polymer (F1) into contact with ammonia, for example, a method of directly bringing the polymer (F1) into contact with ammonia, a method of blowing ammonia to a polymer solution having the polymer (F1) dissolved to carry out bubbling, or a method of bringing the polymer (F1) in a state swollen by a solvent into contact with ammonia, may, for example, be mentioned.

Step (ii):

FSO$_2$(CF$_2$)$_d$SO$_2$F may be prepared by a known process. As a preparation process, in a case where d is 2, for example, the following process may be mentioned.

A process of converting ICF$_2$CF$_2$I which is an addition product of TFE and iodine as a starting material to NaSO$_2$CF$_2$CF$_2$SO$_2$Na by a known method, converting it to ClSO$_2$CF$_2$CF$_2$SO$_2$Cl and finally converting it to FSO$_2$CF$_2$CF$_2$SO$_2$F.

A process of reacting TFE and sulfuric anhydride to form tetrafluoroethane sultone, followed by ring opening and hydrolysis to form FSO$_2$CF$_2$COOH, followed by coupling by Kolbe electrolysis (JP-A-2010-95470).

In the step (ii), it is preferred to swell or dissolve the polymer (F1) in an aprotic polar solvent and react it with FSO$_2$(CF$_2$)$_d$SO$_2$F.

The aprotic polar solvent may, for example, be N,N-dimethylacetamide, N,N-dimethylformamide, 1,3-dimethyl-2-imidazolidinone, N-methyl-2-pyrrolidone, dimethylsulfoxide, sulfolane, γ-butyrolactone, acetonitrile, tetrahydrofuran or 1,4-dioxane.

It is also preferred to use a reaction accelerator when the polymer (F1) is reacted with FSO$_2$(CF$_2$)$_d$SO$_2$F. The reaction accelerator is preferably a tertiary organic amine, and particularly, it is preferably e.g. N,N-tetramethylethylenediamine (TMEDA), trimethylamine, tripropylamine, tributylamine or 1,4-diazabicyclo[2.2.2]octane.

In the step (ii), it is preferred to make no moisture be present, so as to suppress hydrolysis of FSO$_2$(CF$_2$)$_d$SO$_2$F.

Step (iii):

The conversion of —SO$_2$F at the terminal of the polymer obtained in the step (ii) to a sulfonic acid group or a sulfonimide group may be carried out in the same manner as in the step (iii) in the process for producing polymer (H1).

(Reinforcing Member)

The polymer electrolyte membrane of the present invention may have a reinforcing member.

The form of the reinforcing member may, for example, be a porous product, fibers, woven fabric or non-woven fabric. The form of the reinforcing member is preferably a porous product in view of the strength.

The material of the reinforcing member may, for example, be polytetrafluoroethylene (hereinafter referred to as PTFE), a TFE-hexafluoropropylene copolymer, a TFE-perfluoro (alkyl vinyl ether) copolymer, a TFE-ethylene copolymer, polyvinylidene fluoride, polyethylene, polypropylene, polyimide or polyphenylene sulfide. The material of the reinforcing member is preferably a fluorinated material such as PTFE, a TFE-hexafluoropropylene copolymer, a TFE-perfluoro (alkyl vinyl ether) copolymer, a TFE-ethylene copolymer or polyvinylidene fluoride, in view of the chemical durability.

The reinforcing member is preferably a porous product made of PTFE in view of the strength and the chemical durability, with respect to the form and the material of the reinforcing member.

The porosity of the porous product is preferably from 40 to 98%, particularly preferably from 60 to 95%. If the porosity is low, the resistance of the polymer electrolyte membrane tends to be high. Further, if the porosity is too high, no sufficient reinforcing effect will be obtained. Voids in the porous product are preferably mainly voids having such a size that the diameter of the maximum sphere which may contact the interior of each void is from 1 nm to 2 mm, particularly from 5 nm to 500 μm.

A porous product having such voids may be obtained, for example, by an orientation method, a micropore forming extraction method or a phase transition method. The orientation method is suitable to obtain a porous product made of PTFE. The micropore forming extraction method is applicable to porous products made of any material. The phase transition method is effective to obtain a porous product made of polyvinylidene fluoride or polyimide.

(Function Effect)

The above-described polymer electrolyte membrane of the present invention, which contains cerium element and at least one member selected from cesium element and rubidium element, is excellent in the durability to hydrogen peroxide or peroxide radicals as compared with a polymer electrolyte membrane containing cerium element alone, a polymer electrolyte membrane containing cesium element alone or a polymer electrolyte membrane containing rubidium element alone.

The reason why a synergistic effect is attained when the cerium element and at least one member selected from cesium element and rubidium element are used in combination is considered to be as follows.

By addition of cesium element (cesium ions) or rubidium element (rubidium ions) having a particularly large atomic radius (ionic radius) to the ion exchange resin, the mobility of the cation exchange groups is restricted. Accordingly, such an environment can be made that cerium ions (including cerium ions generated from e.g. a hardly soluble cerium compound) efficiently decompose hydrogen peroxide, whereby deterioration of ion exchange resin will be suppressed. As a result, it is considered that the durability of the polymer electrolyte membrane to hydrogen peroxide or peroxide radicals is synergistically improved.

Here, with lithium element, sodium element and potassium element which are the same alkali metals as the cesium element and the rubidium element, the above synergistic effect will not be attained, since their atomic radii (ionic radii) are relatively small.

<Membrane/Electrode Assembly>

FIG. 1 is a cross-sectional view illustrating one example of a membrane/electrode assembly (hereinafter referred to as a membrane/electrode assembly) for a polymer electrolyte fuel cell of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and an ion exchange resin. The catalyst layer 11 of the anode 13 and the catalyst layer 11 of the cathode 14 may be layers having the same component, composition, thickness, etc., or layers differing in them.

The catalyst may be one which accelerate the oxidation-reduction reaction of a fuel cell, preferably a catalyst containing platinum, particularly preferably a supported catalyst having platinum or a platinum alloy supported on a carbon carrier.

The carbon carrier may, for example, be activated carbon or carbon black.

The platinum alloy is preferably an alloy of platinum and at least one metal selected from the group consisting of platinum group metals excluding platinum (ruthenium, rhodium, palladium, osmium and iridium), gold, silver, chromium, iron, titanium, manganese, cobalt, nickel, molybdenum, tungsten, aluminum, silicon, zinc and tin.

The amount of platinum or a platinum alloy supported is preferably from 10 to 70 mass %, more preferably from 10 to 50 mass % in the supported catalyst (100 mass %).

The amount of platinum contained in the catalyst layer 11 is preferably from 0.01 to 3.0 mg/cm$^2$ in view of the optimum thickness to conduct the electrode reaction efficiently, and is more preferably from 0.05 to 0.5 mg/cm$^2$ in view of the balance between the performance and the cost of the material.
(Gas Diffusion Layer)

The gas diffusion layer 12 is a layer made of a gas diffusive substrate such as carbon paper, carbon cloth or carbon felt.

The surface of the gas diffusion layer 12 is preferably subjected to water repellent treatment with a solution or a dispersion containing a water repellent fluoropolymer. By the water repellent treatment, pores of the gas diffusion layer 12 will hardly be clogged with water generated at the catalyst layer 11 on the cathode side, whereby a decrease in the gas diffusion properties will be suppressed. The surface of the gas diffusion layer 12 is more preferably subjected to water repellent treatment with a dispersion containing a water repellent fluoropolymer and conductive carbon, in view of the electrical conductivity of the membrane/electrode assembly 10.

The water-repellent fluoropolymer may, for example, be PTFE. The conductive carbon may, for example, be carbon black.

The surface subjected to the water-repellent treatment of the gas diffusion layer 12 is contacted to the catalyst layer 11 or the after-mentioned carbon layer 16.
(Polymer Electrolyte Membrane)

The polymer electrolyte membrane 15 is the polymer electrolyte membrane of the present invention. The polymer electrolyte membrane 15 may be one having a multi-layered structure having a plurality of ion exchange resin films bonded.

The polymer electrolyte membrane 15 may contain silica or a heteropolyacid (such as zirconium phosphate, phosphorus molybdic acid or phosphorus tungstic acid) as a water retention agent to prevent drying.
(Carbon Layer)

Figure 2:
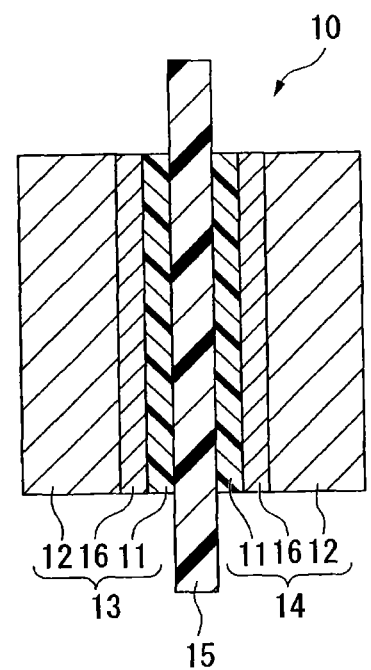
FIG. 2 is a cross-sectional view illustrating another example of a membrane/electrode assembly.

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the output voltage of a polymer electrolyte fuel cell will be remarkably improved.

The carbon layer 16 is a layer containing carbon and a fluoropolymer.

The carbon is preferably carbon nanofibers having a fiber diameter of from 1 to 1,000 nm and a carbon length of at most 1,000 μm.

The fluoropolymer may, for example, be PTFE.
(Subgasket)

The membrane/electrode assembly of the present invention may have two subgaskets (not shown) in the form of a frame disposed to sandwich the polymer electrolyte membrane 15 at the periphery of the membrane/electrode assembly 10.
(Method for Producing Membrane/Electrode Assembly)

The membrane/electrode assembly 10 is produced, for example, by the following method.

(a-1) A method of forming catalyst layers 11 on both sides of a polymer electrolyte membrane 15 to form a membrane/catalyst layer assembly, and sandwiching such a membrane/catalyst layer assembly between gas diffusion layers 12.

(a-2) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(b-1) A method of applying a dispersion containing carbon and a fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12.

(b-2) A method of applying a dispersion containing carbon and a fluoropolymer on a gas diffusion layer 12, followed by drying to form a carbon layer 16, and sandwiching the membrane/catalyst layer assembly obtained in the method (a-1) between the gas diffusion layers 12 each having the carbon layer 16.

As the methods of forming the polymer electrolyte membrane 15 and the catalyst layer 11, known methods such as methods disclosed in Patent Documents 5 and 6 may be employed.
(Function Effect)

In the above-described membrane/electrode assembly 10, since the polymer electrolyte membrane 10 contains cerium element and at least one member selected from cesium element and rubidium element, the ion exchange resin contained in the polymer electrolyte membrane 15 or the catalyst layer 11 is hardly deteriorated. Accordingly, the membrane/electrode assembly 10 is excellent in the durability to hydrogen peroxide or peroxide radicals.

Other Embodiments

The membrane/electrode assembly of the present invention is not limited to the membrane/electrode assembly 10 shown in the drawings.

Further, the catalyst layer 11 of at least one of the anode 13 and the cathode 14 may contain cerium element and at least one member selected from cesium element and rubidium element. In such a case, the polymer electrolyte membrane 15 may or may not contain cerium element and at least one member selected from cesium element and rubidium element. When the catalyst layer 11 contains cerium element and at least one member selected from cesium element and rubidium element, the ion exchange resin contained in the polymer electrolyte membrane 15 or the catalyst layer 11 is hardly deteriorated. Accordingly, the membrane/electrode assembly is excellent in the durability to hydrogen peroxide or peroxide radicals.
<Polymer Electrolyte Fuel Cell>

By disposing a separator having grooves to be gas flow paths formed thereon, on both sides of the membrane/electrode assembly of the present invention, a polymer electrolyte fuel cell is obtained.

As the separator, separators made of various electrically conductive materials, such as a metal separator, a carbon separator and a separator made of a material obtained by mixing graphite and a resin, may be mentioned.

In the polymer electrolyte fuel cell, a gas containing oxygen is supplied to the cathode and a gas containing hydrogen is supplied to the anode, thereby to carry out power generation. Further, the membrane/electrode assembly of the present invention is applicable also to a methanol fuel cell to carry out power generation by supplying methanol to the anode.

EXAMPLES

Now, the present invention will be described in detail with reference to Examples. However, it should be understood that the present invention is by no means restricted to such specific Examples.

Examples 1 to 13, 21 and 22 are Examples of the present invention, and Examples 14 to 20 are Comparative Examples.

(Ion Exchange Capacity)

The ion exchange capacity of the ion exchange resin was obtained by the following method.

The ion exchange resin was put in a glove box through which dry nitrogen was flowed for 24 hours, and then the dry mass of the ion exchange resin was measured. Then, the ion exchange resin was immersed in a 2 mol/L (liter) sodium chloride aqueous solution at 60° C. for one hour. The ion exchange resin was washed with ultrapure water and taken out, and the sodium chloride aqueous solution in which the ion exchange resin had been immersed was titrated with a 0.1 mol/L sodium hydroxide aqueous solution to determine the ion exchange capacity of the ion exchange resin.

(Durability)

The membrane/electrode assembly was assembled in a cell for power generation, and the following open circuit voltage test (OCV test) as an accelerating test was carried out.

Hydrogen (utilization ratio: 50%) and air (utilization ratio: 50%) each corresponding to an electric current density of 0.2 A/cm² were supplied to the anode and to the cathode, respectively, under normal pressure. The cell was operated in an open circuit voltage state without power generation at a cell temperature of 120° C., a gas dew point of the anode of 73° C. and a gas dew point of the cathode of 73° C. On that occasion, the gas discharged was allowed to flow into a 0.1 mol/L potassium hydroxide aqueous solution for 24 hours to capture fluoride ions discharged. Then, the fluoride ion concentration was quantitatively determined by ion chromatography to calculate the fluoride ions release rate.

The durability was evaluated based on the following standards from the fluoride ions release rate 200 hours after initiation of the open circuit voltage test.

⊚⊚: A fluoride ions release rate less than 1 μg/day·cm².

⊚: A fluoride ions release rate of at least 1 μg/day·cm² and less than 3 μg/day·cm².

○: A fluoride ions release rate of at least 3 μg/day·cm² and less than 5 μg/day·cm².

Δ: A fluoride ions release rate of at least 5 μg/day·cm² and less than 10 μg/day·cm².

X: A fluoride ions release rate of at least 10 μg/day·cm² and less than 20 μg/day·cm².

XX: A fluoride ions release rate of at least 20 μg/day·cm².

(Compound (m2-2))

Compound (m2-2) was prepared in accordance with the method disclosed in Examples of Patent Document 6.

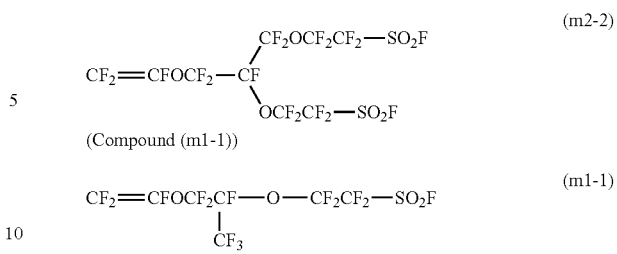

(Compound (m1-1))

(Radical Initiator)
Compound (i-1):

(Solvent)
Compound (s-1):

$CClF_2CF_2CHClF$      (s-1)

Compound (s-2):

(Polymer (H2-1))

Into a stainless steel autoclave having an internal capacity of 230 mL, 140.0 g of compound (m2-2), 30.2 g of compound (s-1) and 170 mg of compound (i-1) were charged, followed by sufficient deaeration of the autoclave under cooling with liquid nitrogen. Then, the temperature was raised to 65° C., TFE was introduced into the system, and the pressure was maintained at 1.23 MPaG. After stirring at 65° C. for 7.2 hours, the gas in the system was purged, and the autoclave was cooled to complete the reaction. The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F2-1). The yield was 27.2 g.

Polymer (F2-1) was immersed in an aqueous solution containing 20 mass % of methanol and 15 mass % of potassium hydroxide at 80° C. for 16 hours to hydrolyze and convert —SO₂F in polymer (F2-1) to —SO₃K. Then, the polymer was immersed in a 3 mol/L hydrochloric acid aqueous solution for 2 hours. The hydrochloric acid aqueous solution was changed, and the same treatment was further carried out four times. Then, the polymer was sufficiently washed with ultrapure water to obtain polymer (H2-1) having —SO₃K in the above polymer converted to a sulfonic acid group. The ion exchange capacity of the polymer (H2-1) was 1.51 meq/g dry resin.

To polymer (H2-1), a solvent mixture of ethanol, water and 1-butanol (ethanol/water/1-butanol=35/50/15 mass ratio) was added to adjust the solid content concentration to 15 mass %, followed by stirring using an autoclave at 125° C. for 8 hours. Water was further added to adjust the solid content concentration to 9 mass % to obtain dispersion (D-1) having polymer (H2-1) dispersed in a dispersion medium. The composition of the dispersion medium was ethanol/water/1-butanol=20/70/10 (mass ratio).

(Polymer (H1-1))

Into a stainless steel autoclave having an internal capacity of 230 mL, 123.8 g of compound (m1-1), 63.6 g of compound (s-1) and 63.6 mg of compound (i-1) were charged, followed by sufficient deaeration under cooling with liquid nitrogen. Then, the temperature was raised to 70° C., TFE was introduced into the system, and the pressure was maintained at 1.14 MPaG. After stirring for 8 hours, the autoclave was cooled to terminate the reaction. The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F1-1). The yield was 25.2 g.

Polymer (F1-1) was treated in the same manner as for polymer (F2-1) to obtain polymer (H1-1). The ion exchange capacity of polymer (H1-1) was 1.10 meq/g dry resin.

To polymer (H1-1), a solvent mixture of ethanol and water (ethanol/water=70/30 mass ratio) was added to adjust the solid content concentration to 20 mass %, followed by stirring using an autoclave at 125° C. for 8 hours. Water was further added to adjust the solid content concentration to 15 mass % to obtain dispersion (D-2) having polymer (H1-1) dispersed in a dispersion medium. The composition of the dispersion medium was ethanol/water=35/65 (mass ratio).

(Polymer (H3-1))

10 g of polymer (F1-1) and 500 g of $CF_3(CF_2)_5H$ were put in a pressure resistant reactor equipped with a stirrer, heated to 140° C. and stirred to prepare a solution. The solution was charged into a 1 L flask equipped with a stirrer and a dry ice condenser, and while the flask was cooled with dry ice at room temperature of from 20 to 25° C., bubbling was continued for 10 hours so that ammonia was always recycled and the internal temperature was not at most −30° C., whereupon the solution became clouded, and a white solid was precipitated. Cooling with dry ice was stopped, and stirring was continued at room temperature of from 20 to 25° C. for 16 hours, and then the solution was subjected to filtration, the obtained solid was washed six times with a 3 mol/L hydrochloric acid aqueous solution and further washed five times with ultrapure water, and dried to obtain 9.8 g of polymer (N3-1).

Polymer (N3-1) was analyzed by infrared spectrometry, whereupon a peak attributable to —$SO_2F$ in the vicinity of 1,467 cm$^{-1}$ disappeared, and a peak attributable to —$SO_2NH_2$ in the vicinity of −1,388 cm$^{-1}$ was confirmed.

1 g of polymer (N3-1), and 20 g of N,N-dimethylacetamide dehydrated by means of molecular sieves 4A were charged into a flask equipped with a cooling condenser and dissolved, and then 1.02 g of N,N'-tetramethylethylenediamine and 2.34 g of $FSO_2(CF_2)_2SO_2F$ were charged under sealing with nitrogen, the mixture was heated to 80° C. and stirred for 48 hours. The molar ratio of $FSO_2(CF_2)_2SO_2F$ to —$SO_2NH_2$ which polymer (N3-1) has was adjusted to be 8:1. The obtained solution was a uniform solution, and no gelation was confirmed.

To the solution before reaction and the obtained reaction solution, a very small amount of hexafluorobenzene as a standard solution (−162.5 ppm) was added, and $^{19}$F-NMR was measured, whereupon a peak attributable to —$CF_2$—$SO_2NH_2$ in the vicinity of −116.2 ppm observed in the solution before reaction disappeared in the reaction solution, and peaks attributable to —$CF_2$—$SO_2N(H)SO_2(CF_2)_2SO_2F$ were confirmed in the vicinity of −104.0 ppm, −115.3 ppm and −110.6 ppm. The reaction solution was cast on a glass dish, dried at 80° C. overnight, then dried under reduced pressure at 80° C. for 2 hours and finally dried at 150° C. for 30 minutes to obtain polymer (F3-1).

Polymer (F3-1) was immersed in an aqueous solution containing 20 mass % of methanol and 15 mass % of potassium hydroxide at 80° C. for 16 hours, washed with water until the pH of the water used for washing became 7, and further immersed four times in a 3 mol/L hydrochloric acid aqueous solution. Then, it was immersed in a 10 mass % hydrogen peroxide solution (80° C.) overnight and immersed in a 3 mol/L hydrochloric acid aqueous solution again to remove potassium remaining in the polymer. Then, the polymer was washed with water until the pH of the water used for washing became 7 to obtain polymer (H3-1).

The obtained polymer (H3-1) was analyzed by infrared spectrometry, whereupon a peak attributable to —$SO_2F$ in the polymer (F3-1) disappeared, and it was confirmed that —$SO_2F$ was converted to —$SO_2N(H)SO_2(CF_2)_2SO_3H$. The ion exchange capacity of polymer (H3-1) was 1.56 meq/g dry resin.

To polymer (H3-1), a solvent mixture of ethanol and water (ethanol/water=90/10 mass ratio) was added to adjust the solid content concentration to 5 mass %, and heated to 85° C. and stirred for 24 hours. Further, the liquid was concentrated to a concentration of 12 mass % by an evaporator to obtain dispersion (D-3) having polymer (H3-1) dispersed in a dispersion medium. The composition of the dispersion medium was ethanol/water=80/20 (mass ratio).

(Polymer (H3-2))

Dispersion (D-4) having polymer (H3-2) dispersed in a dispersion medium was obtained in the same manner as polymer (H3-1) except that 3.22 g of $FSO_2(CF_2)_4SO_2F$ was used instead of $FSO_2(CF_2)_2SO_2F$.

Polymer (H3-2) was analyzed by infrared spectrometry, whereupon a peak attributable to —$SO_2F$ in polymer (F3-2) disappeared, and it was confirmed that —$SO_2F$ was converted to —$SO_2N(H)SO_2(CF_2)_4SO_3H$. The ion exchange capacity of polymer (H3-2) was 1.43 meq/g dry resin.

Example 1

To obtain a polymer electrolyte membrane having 10 mol % of cesium ions (monovalent) and 10 mol % of cerium ions (trivalent) added based on the number (100 mol %) of cation exchange groups of polymer (H2-1), the following operation was carried out.

0.221 g of cesium carbonate ($Cs_2CO_3$) was added to 100 g of dispersion (D-1), followed by stirring at room temperature for 16 hours. Bubbles due to generation of $CO_2$ was confirmed from the initiation of stirring, however, finally, a uniform and transparent liquid composition was obtained. To the obtained liquid composition, 0.137 g of cerium carbonate hydrate ($Ce_2(CO_3)_3.8H_2O$) was added, followed by stirring at room temperature for 24 hours. Bubbles due to generation of $CO_2$ was confirmed similarly from the initiation of stirring, however, finally, uniform and transparent liquid composition (L-1) was obtained.

Liquid composition (L-1) was cast on an ethylene/tetrafluoroethylene copolymer (ETFE) sheet (tradename: Aflex 100N, manufactured by Asahi Glass Company, Limited) by a die coater, preliminarily dried at 80° C. for 10 minutes, dried at 120° C. for 10 minutes, and further subjected to heat treatment at 180° C. for 30 minutes to obtain polymer electrolyte membrane (M-1) having a thickness of 25 μm. In the following Examples 2 to 20 also, the thickness of each of polymer electrolyte membranes (M-2 to 20) is 25 μm.

42 g of water was added to 10 g of a supported catalyst having 30 mass % of platinum and 23 mass % of ruthenium supported on a carbon powder, and ultrasonic waves were applied for 10 minutes to obtain a dispersion of the catalyst. To the dispersion of the catalyst, 63 g of dispersion (D-1) was added, and 42 g of ethanol was further added to adjust the solid content concentration to 10 mass %, thereby to obtain the liquid for forming a catalyst layer for an anode. The liquid was applied on an ETFE sheet, dried at 80° C. for 30 minutes and further subjected to heat treatment at 160° C. for 30 minutes to form a catalyst layer for an anode having a platinum amount of 0.2 mg/cm$^2$.

42 g of water was added to 10 g of a supported catalyst having 50 mass % of platinum supported on a carbon powder, and ultrasonic waves were applied for 10 minutes to obtain a dispersion of the catalyst. To the dispersion of the catalyst, 67 g of dispersion (D-1) was added, and 42 g of ethanol was further added to adjust the solid content concentration to 10 mass %, thereby to obtain a liquid for forming a catalyst layer for a cathode. The liquid was applied on an ETFE sheet, dried at 80° C. for 30 minutes and further subjected to heat treatment at 160° C. for 30 minutes to form a catalyst layer for a cathode having a platinum amount of 0.5 mg/cm$^2$.

The ETFE sheet was separated from polymer electrolyte membrane (M-1), and polymer electrolyte membrane (M-1) was sandwiched between the catalyst layer for an anode and the catalyst layer for a cathode, heat pressed at a pressing temperature of 160° C. for a pressing time of 5 minutes under a pressure of 3 MPa to bond the catalyst layers to both sides of polymer electrolyte membrane (M-1), and the ETFE sheet was separated from each catalyst layer thereby to obtain a membrane/catalyst layer assembly having an electrode area of 25 cm$^2$.

On a gas diffusion layer made of carbon paper, a carbon layer comprising carbon and polytetrafluoroethylene was formed. The membrane/catalyst layer assembly was sandwiched between such gas diffusion layers so that the carbon layer and the catalyst layer were in contact with each other to obtain a membrane/electrode assembly. The durability of the membrane/electrode assembly was evaluated. The results are shown in Table 1.

Examples 2 and 3

Polymer electrolyte membranes (M-2) and (M-3) were obtained in the same manner as in Example 1 except that the addition amount of cesium ions (monovalent) was changed to 5 mol % and 1 mol %, respectively. Membrane/electrode assemblies were prepared in the same manner as in Example 1, and the durability was evaluated. The results are shown in Table 1.

Examples 4 and 5

Polymer electrolyte membranes (M-4) and (M-5) are obtained in the same manner as in Example 2 except that the addition amount of cerium ions (trivalent) is changed to 15 mol % and 8 mol %, respectively. Membrane/electrode assemblies are prepared in the same manner as in Example 1, and the durability is evaluated. The results are shown in Table 1.

Example 6

Polymer electrolyte membrane (M-6) was obtained in the same manner as in Example 1 except that the order of addition of cesium carbonate ($Cs_2CO_3$) and cerium carbonate hydrate ($Ce_2(CO_3)_3 \cdot 8H_2O$) was reversed, so that cesium carbonate was added after cerium carbonate hydrate was added. Membrane/electrode assembly was prepared in the same manner as in Example 1, and the durability was evaluated. The results are shown in Table 1.

Example 7

Polymer electrolyte membrane (M-7) was obtained in the same manner as in Example 1 except that rubidium carbonate ($Rb_2CO_3$) was used instead of cesium carbonate ($Cs_2CO_3$). Membrane/electrode assembly was prepared in the same manner as in Example 1, and the durability was evaluated. The results are shown in Table 1.

Example 8

Liquid composition (L-8) is obtained using cerium oxide ($Ce_2O_3$) instead of cerium carbonate hydrate ($Ce_2(CO_3)_3 \cdot 8H_2O$). Polymer electrolyte membrane (M-8) is obtained in the same manner as in Example 1 except that liquid composition (L-8) is used instead of liquid composition (L-1). Membrane/electrode assembly is prepared in the same manner as in Example 1, and the durability is evaluated. The results are shown in Table 1.

Example 9

Liquid composition (L-9) is obtained using cerium oxide ($CeO_2$) instead of cerium carbonate hydrate ($Ce_2(CO_3)_3 \cdot 8H_2O$). Polymer electrolyte membrane (M-9) is obtained in the same manner as in Example 1 except that liquid composition (L-9) is used instead of liquid composition (L-1). Membrane/electrode assembly is prepared in the same manner as in Example 1, and the durability is evaluated. The results are shown in Table 1.

Example 10

Polymer electrolyte membrane (M-10) is obtained in the same manner as in Example 2 except that dispersion (D-3) is used instead of dispersion (D-1). Membrane/electrode assembly is prepared in the same manner as in Example 2, and the durability is evaluated. The results are shown in Table 1.

Example 11

Polymer electrolyte membrane (M-11) is obtained in the same manner as in Example 10 except that cerium oxide ($Ce_2O_3$) is used instead of cerium carbonate hydrate ($Ce_2(CO_3)_3 \cdot 8H_2O$). Membrane/electrode assembly is prepared in the same manner as in Example 10, and the durability is evaluated. The results are shown in Table 1.

Examples 12 and 13

Polymer electrolyte membranes (M-12) and (M-13) are obtained in the same manner as in Example 2 except that dispersions (D-4) and (D-2) are respectively used instead of dispersion (D-1). Membrane/electrode assemblies are prepared in the same manner as in Example 2, and the durability is evaluated. The results are shown in Table 1.

Example 14

Liquid composition (L-2) is obtained in the same manner as in Example 1 except that the addition amount of cesium ions (monovalent) is changed to 5 mol %.

Liquid composition (L-2) is cast on an ETFE sheet by a die coater. Then, immediately, a PTFE porous product (tradename: POREFLON FP-010-60, Sumitomo Electric Fine Polymer, Inc.) is immersed in the coating layer. After preliminary drying at 80° C. for 10 minutes, drying at 120° C. for 10 minutes is carried out, and heat treatment at 180° C. for 30 minutes is further carried out to obtain polymer electrolyte membrane (M-14) having a thickness of 40 μm. Using polymer electrolyte membrane (M-14), membrane/electrode assembly is prepared in the same manner as in Example 1, and the durability is evaluated. The results are shown in Table 1.

Example 15

Polymer electrolyte membrane (M-15) was obtained in the same manner as in Example 1 except that no cesium carbonate ($Cs_2CO_3$) was added. Membrane/electrode assembly was prepared in the same manner as in Example 1, and the durability was evaluated. The results are shown in Table 1.

Example 16

Polymer electrolyte membrane (M-16) was obtained in the same manner as in Example 1 except that no cerium carbonate hydrate ($Ce_2(CO_3)_3 \cdot 8H_2O$) was added. Membrane/electrode assembly was prepared in the same manner as in Example 1, and the durability was evaluated. The results are shown in Table 1.

Example 17

Polymer electrolyte membrane (M-17) is obtained in the same manner as in Example 4 except that no cerium carbonate hydrate ($Ce_2(CO_3)_3 \cdot 8H_2O$) is added. Membrane/electrode assembly is prepared in the same manner as in Example 7, and the durability is evaluated. The results are shown in Table 1.

Example 18

Polymer electrolyte membrane (M-18) is obtained in the same manner as in Example 9 except that no cesium carbonate ($Cs_2CO_3$) is added. Membrane/electrode assembly is prepared in the same manner as in Example 10, and the durability is evaluated. The results are shown in Table 1.

Examples 19 and 20

Polymer electrolyte membranes (M-19) and (M-20) were obtained in the same manner as in Example 1 except that lithium carbonate ($Li_2CO_3$) and potassium carbonate ($K_2CO_3$) were respectively used instead of cesium carbonate ($Cs_2CO_3$). Membrane/electrode assemblies were prepared in the same manner as in Example 1, and the durability was evaluated. The results are shown in Table 1.

Example 21

Polymer electrolyte membrane (M-21) is obtained in the same manner as in Example 13 except that no cesium carbonate ($Cs_2CO_3$) is added. Membrane/electrode assembly is prepared in the same manner as in Example 13, and the durability is evaluated. The results are shown in Table 1.

TABLE 1

| Ex. | No. | Polymer | Addition of Cs/Rb | Addition of Ce | Durability |
|---|---|---|---|---|---|
| 1 | M-1 | H2-1 | Cs ions 10 mol % | Ce ions 10 mol % | ⊚⊚ |
| 2 | M-2 | H2-1 | Cs ions 5 mol % | Ce ions 10 mol % | ⊚ |
| 3 | M-3 | H2-1 | Cs ions 1 mol % | Ce ions 10 mol % | ○ |
| 4 | M-4 | H2-1 | Cs ions 5 mol % | Ce ions 15 mol % | ⊚⊚ |
| 5 | M-5 | H2-1 | Cs ions 5 mol % | Ce ions 8 mol % | ○ |
| 6 | M-6 | H2-1 | Cs ions 5 mol % (added after Ce) | Ce ions 10 mol % (added before Cs) | ○ |
| 7 | M-7 | H2-1 | Rb ions 10 mol % | Ce ions 10 mol % | ⊚ |
| 8 | M-8 | H2-1 | Cs ions 10 mol % | $Ce_2O_3$ 10 mol % (calculated as trivalent ions) | ⊚ |
| 9 | M-9 | H2-1 | Cs ions 10 mol % | $CeO_2$-13 mol % (calculated as tetravalent ions) | ⊚ |
| 10 | M-10 | H3-1 | Cs ions 5 mol % | Ce ions 10 mol % | ⊚ |
| 11 | M-11 | H3-1 | Cs ions 5 mol % | $Ce_2O_3$ 10 mol % (calculated as trivalent ions) | ○ |
| 12 | M-12 | H3-2 | Cs ions 5 mol % | Ce ions 10 mol % | ⊚ |
| 13 | M-13 | H1-1 | Cs ions 5 mol % | Ce ions 10 mol % | ⊚⊚ |
| 14 | M-14 (Porous product) | H2-1 | Cs ions 5 mol % | Ce ions 10 mol % | ⊚ |
| 15 | M-15 | H2-1 | — | Ce ions 10 mol % | X |
| 16 | M-16 | H2-1 | Cs ions 10 mol % | — | XX |
| 17 | M-17 | H2-1 | Rb ions 10 mol % | — | XX |
| 18 | M-18 | H3-1 | — | Ce ions 10 mol % | X |
| 19 | M-19 | H2-1 | Li ions 10 mol % | Ce ions 10 mol % | X |
| 20 | M-20 | H2-1 | K ions 10 mol % | Ce ions 10 mol % | X |
| 21 | M-21 | H1-1 | — | Ce ions 10 mol % | Δ |

Example 22

Membrane/electrode assembly is prepared in the same manner as in Example 15 except that liquid composition (L-1) is used instead of dispersion (D-1) used for the catalyst layer for an anode and the catalyst layer for a cathode, and the durability is evaluated. The results are shown in Table 2.

Example 23

Membrane/electrode assembly is prepared in the same manner as in Example 15 except that liquid composition (L-8) is used instead of dispersion (D-1) used for the catalyst layer for an anode and the catalyst layer for a cathode, and the durability is evaluated. The results are shown in Table 2.

Example 24

Membrane/electrode assembly is prepared in the same manner as in Example 15 except that liquid composition (L-9) is used instead of dispersion (D-1) used for the catalyst layer for an anode and the catalyst layer for a cathode, and the durability is evaluated. The results are shown in Table 2.

TABLE 2

| Ex. | Catalyst layer Polymer | Addition of Cs/Rb | Addition of Ce | Electrolyte membrane | Durability |
|---|---|---|---|---|---|
| 22 | H2-1 | Cs ions 10 mol % | Ce ions 10 mol % | M-15 | ⊚ |
| 23 | H2-1 | Cs ions 10 mol % | $Ce_2O_3$ ions 10 mol % (calculated as trivalent ions) | M-15 | ○ |
| 24 | H2-1 | Cs ions 10 mol % | $CeO_2$ ions 13 mol % (calculated as tetravalent ions) | M-15 | ○ |
| 15 | H2-1 | — | — | M-15 | X |

INDUSTRIAL APPLICABILITY

The membrane/electrode assembly having the polymer electrolyte membrane of the present invention is useful as a membrane/electrode assembly for a polymer electrolyte fuel cell which is required to operate stably for a long period of time.

The entire disclosures of Japanese Patent Application No. 2011-185103 filed on Aug. 26, 2011 and U.S. Provisional Patent Application No. 61/568,456 filed on Dec. 8, 2011 including specifications, claims, drawings and summaries are incorporated herein by reference in their entireties.

What is claimed is:

1. A polymer electrolyte membrane, comprising:
   (A) an ion exchange resin comprising cation exchange groups which comprise protons;
   (B) a cerium ion; and
   (C) at least one second ion selected from the group consisting of a cesium ion and a rubidium ion,
   wherein a proportion of the cerium ion to the number of the cation exchange groups (100 mol %) is from 0.7 to 30 mol % such that some of the protons in the cation exchange groups are ion-exchanged by the cerium ion, and
   wherein a total proportion of the at least one second ion to the number of the cation exchange groups (100 mol %) is from 0.2 to 15 mol % such that some of the protons in the cation exchange groups are ion-exchanged by the at least one second ion.

2. The polymer electrolyte membrane according to claim 1, wherein the proportion of the cerium ion to the number of the cation exchange groups is from 1 to 20 mol %.

3. The polymer electrolyte membrane according to claim 1, wherein the ion exchange resin is a fluorinated ion exchange resin.

4. The polymer electrolyte membrane according to claim 3, wherein the fluorinated ion exchange resin comprises a group represented by formula (β)

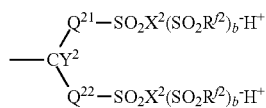

wherein $Q^{21}$ is a perfluoroalkylene group which optionally comprises an etheric oxygen atom,
   $Q^{22}$ is a single bond or a perfluoroalkylene group which optionally comprises an etheric oxygen atom,
   $R^{f2}$ is a perfluoroalkyl group which optionally comprises an etheric oxygen atom,
   $X^2$ is an oxygen atom, a nitrogen atom or a carbon atom,
   b is 0 when $X^2$ is an oxygen atom, is 1 when $X^2$ is a nitrogen atom, and is 2 when $X^2$ is a carbon atom, and
   $Y^2$ is a fluorine atom or a monovalent perfluoroorganic group.

5. The polymer electrolyte membrane according to claim 3, wherein the fluorinated ion exchange resin comprises a group represented by formula (γ):

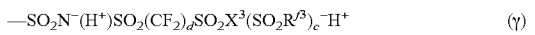

wherein $R^{f3}$ is a $C_{1-10}$ perfluoroalkyl group which optionally comprises an etheric oxygen atom,
   $X^3$ is an oxygen atom or a nitrogen atom,
   c is 0 when $X^3$ is an oxygen atom, and is 1 when $X^3$ is a nitrogen atom, and
   d is an integer of from 1 to 4.

6. The polymer electrolyte membrane according to claim 1, further comprising a reinforcing member.

7. The polymer electrolyte membrane according to claim 6, wherein the reinforcing member is a porous product made of polytetrafluoroethylene.

8. The polymer electrolyte membrane according to claim 1, wherein the polymer electrolyte membrane is obtained by adding the at least one second ion to a dispersion which comprises a dispersion medium and the ion exchange resin dispersed in the dispersion medium, and by adding the cerium ion to the dispersion after adding the at least one second ion to the dispersion.

9. The polymer electrolyte membrane according to claim 1, wherein the proportion of the cerium ion to the number of the cation exchange groups is from 1.5 to 15 mol %.

10. A membrane/electrode assembly, comprising:
    an anode;
    a cathode; and
    polymer electrolyte membrane of claim 1,
    wherein the polymer electrolyte membrane is disposed between the anode and the cathode.

11. A polymer electrolyte membrane, comprising:
    (A) an ion exchange resin comprising cation exchange groups which comprise protons;
    (B) a cerium ion; and
    (C) a cesium ion,
    wherein a proportion of the cerium ion to the number of the cation exchange groups (100 mol %) is from 0.7 to 30 mol % such that some of the protons in the cation exchange groups are ion-exchanged by the cerium ion, and
    wherein a proportion of the cesium ion to the number of the cation exchange groups (100 mol %) is from 0.2 to 15 mol % such that some of the protons in the cation exchange groups are ion-exchanged by the cesium ion.

12. The polymer electrolyte membrane according to claim 11, wherein the proportion of the cerium ion to the number of the cation exchange groups is from 1 to 20 mol %.

13. The polymer electrolyte membrane according to claim 11, wherein the ion exchange resin is a fluorinated ion exchange resin.

14. The polymer electrolyte membrane according to claim 13, wherein the fluorinated ion exchange resin comprises a group represented by formula (β):

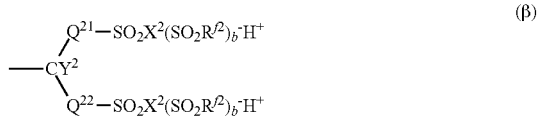

wherein $Q^{21}$ is a perfluoroalkylene group which optionally comprises an etheric oxygen atom,
    $Q^{22}$ is a single bond or a perfluoroalkylene group which optionally comprises an etheric oxygen atom,
    $R^{f2}$ is a perfluoroalkyl group which optionally comprises an etheric oxygen atom,
    $X^2$ is an oxygen atom, a nitrogen atom or a carbon atom,
    b is 0 when $X^2$ is an oxygen atom, is 1 when $X^2$ is a nitrogen atom, and is 2 when $X^2$ is a carbon atom, and
    $Y^2$ is a fluorine atom or a monovalent perfluoroorganic group.

15. The polymer electrolyte membrane according to claim 13, wherein the fluorinated ion exchange resin comprises a group represented by formula (γ):

wherein $R^{f3}$ is a $C_{1-10}$ perfluoroalkyl group which optionally comprises an etheric oxygen atom, $X^3$ is an oxygen atom or a nitrogen atom, c is 0 when $X^3$ is an oxygen atom, and is 1 when $X^3$ is a nitrogen atom, and d is an integer of from 1 to 4.

16. The polymer electrolyte membrane according to claim 11, further comprising a reinforcing member.

17. The polymer electrolyte membrane according to claim 16, wherein the reinforcing member is a porous product made of polytetrafluoroethylene.

18. A membrane/electrode assembly, comprising:

an anode;

a cathode; and the polymer electrolyte membrane of claim 11, wherein the polymer electrolyte membrane is disposed between the anode and the cathode.

* * * * *